United States Patent [19]

Mahlein et al.

[11] 4,089,582
[45] May 16, 1978

[54] NARROW BAND REFLECTION POLARIZER

[75] Inventors: Hans Mahlein; Gerhard Winzer, both of Munich, Germany

[73] Assignee: Siemens Aktiengesellschaft, Berlin & Munich, Germany

[21] Appl. No.: 605,260

[22] Filed: Aug. 18, 1975

[30] Foreign Application Priority Data

Sep. 11, 1974 Germany .............................. 2443511

[51] Int. Cl.² ................................................ G02B 5/14
[52] U.S. Cl. ................................... 350/96.13; 350/152
[58] Field of Search ................ 350/96 WG, 96 C, 152

[56] References Cited

U.S. PATENT DOCUMENTS 3,905,676  9/1975  Ulrich .............................. 350/96 C

FOREIGN PATENT DOCUMENTS 2,252,826  5/1974  Germany .............................. 350/152

Primary Examiner—John K. Corbin
Assistant Examiner—Rolf Hille
Attorney, Agent, or Firm—Hill, Gross, Simpson, Van Santen, Steadman, Chiara & Simpson

[57] ABSTRACT

The invention discloses a wave guide structure utilizing a narrow band reflection polarizer comprising a substrate and a multiple layer dielectric for a generally incident unpolarized electromagnetic wave of wavelength $\lambda_1$ in the ultraviolet, visible, and infrared regions. The dielectric layers comprise a medium having an index of refraction $n_o$, and at least two layers deposited by vaporization of material having alternatively high and low indices of refraction, $n_2$ and $n_1$, respectively. The layers having the high and low refractive indices exhibit the same effective optic layer thickness equal to $(\frac{1}{4})(j+1)\lambda_1$, where $j$ = even integers, for the refractive index structure $n_s(n_1, n_2)^k n_o$ or $n_s(n_1, n_2)^k n_1 n_o$ and $n_1$ = index of refraction of the first layer connected to the medium, $n_2$ = index of refraction of the second layer connected serially to the first layer, and $k = 0, 1, 2, \ldots$. The resulting reflected wave is polarized parallel or vertically to the plane of incidence.

2 Claims, 4 Drawing Figures

NARROW BAND REFLECTION POLARIZER

BRIEF SUMMARY OF THE INVENTION

In the German Pat. No. P 2,252,826, a reflection polarizer is disclosed wherein the component polarized parallel to the plane of incidence and, selectively, the component polarized vertically to the plane of incidence is suppressed by means of the narrow band.

In the known reflection polarizers, a linearly polarized wave is obtained from an unpolarized radiation incident at a Brewster's angle by means of reflection on one or several superposed boundary surfaces of dielectric layers. As early as 1947, M. Banning in an article in *Journal Opt. Soc. Amer.*, 1947, page 792, and following, describes such a construction, in which the reflection capability for the reflection component (s-component), polarized vertically to the plane of incidence, is increased by a dielectric multiple layer system arranged between two prisms.

Reflection polarizers based on Brewster's Law, however, have a spectrally wide-band effect, and the reflection capability can be suppressed always only for the p-component polarized parallel to the plane of incidence.

The German Pat. No. P 2,252,826 discloses a reflection polarizer in which the s- or the p-components of the incident unpolarized wave are suppressed via a narrow band.

The problem is solved by a reflection polarizer of the type cited at the beginning, which, according to the invention, is dimensioned so as to satisfy the relationship $$k = \frac{1}{2} \cdot \frac{\ln(n_s^2 - n_o^2 \sin^2\theta_o) - \ln(n_o^2 - n_o^2 \sin^2\theta_o)}{\ln(n_1^2 - n_o^2 \sin^2\theta_o) - \ln(n_2^2 - n_o^2 \sin^2\theta_o)}$$

for a refractive index structure $n_s(n_1, n_2)^k n_o$ where $k = 0,1,2, \ldots +\infty$. The reflected wave is thus polarized parallel to the plane of incidence.

An alternate solution to the problem posed may also be achieved by a dimensioning of the reflection polarizer, according to the invention, in accordance with the solution of the relationship $$k = \frac{1}{2} \cdot \frac{4 \ln n_s + \ln(1 - \sin^2\theta_o) - 2 \ln n_o - \ln(n_s^2 - n_o^2\sin^2\theta_o)}{4 \ln n_1 + \ln(n_2^2 - n_o^2\sin^2\theta_o) - 4 \ln n_2 - \ln(n_1^2 - n_o^2\sin^2\theta_o)}$$

for a refractive index structure $n_s(n_1, n_2)^k n_o$, where $k = 0,1,2, \ldots, +\infty$. The reflected wave is thus polarized vertical to the plane of incidence.

According to an additional solution, the dimensioning is further made dependent on the solution of $$k = \frac{1}{2} \cdot$$

$$\frac{\ln(n_s^2 - n_o^2 \sin^2\theta_o) + \ln(n_o^2 - n_o^2 \sin^2\theta_o) - 2 \ln(n_1^2 - n_o^2 \sin^2\theta_o)}{\ln(n_1^2 - n_o^2 \sin^2\theta_o) - \ln(n_2^2 - n_o^2 \sin^2\theta_o)}$$

for a refractive index structure defined by the relationship $n_s(n_1, n_2)^k n_1, n_o$, where $k = 0,1,2, \ldots, +\infty$. The reflected radiation is thus polarized parallel to the plane of incidence.

The final dimension for the reflective polarizer are determined by solving the equation $$k = \frac{1}{2} \cdot \frac{4\ln n_s + 2\ln n_o + 2\ln(n_1^2 - n_o\sin^2\theta_o) - 8\ln n_1 - \ln(n_s^2 - n_o^2\sin^2\theta_o) - \ln(1 - \sin^2\theta_o)}{4\ln n_1 + \ln(n_2^2 - n_o^2\sin^2\theta_o) - 4\ln n_2 - \ln(n_1^2 - n_o^2\sin^2\theta_o)}$$

for a refractive index structure defined by the relationship $n_s(n_1, n_2)^k n_1, n_o$, where $k = 0,1,2, \ldots, +\infty$. The reflected radiation is here polarized vertical to the plane of incidence.

From the cited equations, for given refraction indices and a desired polarization component of the reflected radiation, the dimensions of the polarizer and the several varying angles of incidence for each construction can be determined.

The action of a polarization filter results from the narrow-bandedness of the reflection polarizer interacting with the incident wide-band wave.

The present invention is based on the problem of installing these reflection polarizers in integrated optic wave conductor structures.

This problem is solved according in the invention in that at least one multiple layer system is connected to a waveguide layer arranged on a substrate in such a way that the light beams transmitted in the waveguide layer are coupled into the multiple layer system and upon passing through the multiple layer system, at least a portion of the light beam is coupled back into the waveguide layer.

All interrelationships stated in the German Pat. No. P 2,252,826 can be adopted in the integrated optic structures during installation of the multiple layer system. If the multiple layer system is arranged directly on the waveguide layer, the effective index of refraction of the modes transmitted in the waveguide layer must be smaller than $n_1$ and $n_2$ in order that the unpolarized light transferred forward in the waveguide layer is coupled into the multiple layer system by means of a transmission line. Here, according to the construction of the multiple layer system, the component of the light polarized parallel or vertical to the plane of incidence is selectively transmitted back and then forward by means of internal reflections in the waveguide layer, while the corresponding component preferably reaches an absorber located on the multiple layer system, or a glass parallelepiped block having scattering or refracting surfaces which transmit the light outwards. It is thereby insured that the undesired components of the light which pass through the absorber or the glass parallelepiped block do not re-enter back into the waveguide layer via the multiple layer system.

An alternate integrated optic construction of the narrow band reflection polarizer is obtained by arranging a symmetrical prism on the waveguide layer, having a base plane parallel to the waveguide layer, and a multipler layer system on at least one lateral face of the prism. The prism acts as a decoupling element as well as a coupling element if the prism is symmetrical, so that the coupling angle is equal to the decoupling angle.

A construction with a multiple layer system on both lateral faces of the prism, respectively, results in a greater efficiency in the polarization and the spectro-selective action. An additional advantage of the utilization of the prism results if its dihedral angles are so selected that the light striking one lateral face provided with multiple layer system is reflected on itself, and is transferred back via the waveguide layer in a direction opposite to the direction of incidence.

A further integrated optic construction of the narrow band reflection polarizer, which requires no allowance for particular refraction index differences between the waveguide layer and the first layer of the multiple layer system which borders on this waveguide layer, comprises, in particular, a defraction grid arranged between the substrate and the multiple layer system. The multiple layer system can be directly applied onto said defraction grid. Here, the light incident on waveguide layer is at each point of the grid back coupled into the multiple layer system, and from this multiple system back coupled into the waveguide layer. Since the light in the path of the waveguide layer which lies underneath the grid is repeatedly affected by the multiple layer system, the reflection polarizer repeatedly acts upon the light waves.

In all of the above cited constructions, however, a fragment of a light transferred via the waveguide layer continues to be transferred unaffected in the waveguide layer without being coupled into the multiple layer system.

In order to avoid this, the waveguide layer with a Bragg-grid arranged above it, is propitiously interrupted by a separating layer. In order that light portions after their reflection on the multiple layer system, do not reach this separating layer and thereby disappear, a spacing piece is arranged between a Bragg-grid and the multiple layer system. If a modular crystal is selected as the material for this spacing piece, the light waves passing through this crystal can be modulated.

In all the cited variations of the invention, the light which is further transferred in the waveguide layer is not only polarized, but also spectro-selectively filtered.

DESCRIPTION OF PREFERRED EMBODIMENT

FIGS. 1 through 4 cross sectionally illustrate the several integrated optic structures of a wave guide utilizing a narrow band reflection polarizers.

The invention discloses a wave guide structure utilizing a narrow band reflection polarizer comprising a substrate and a multiple layer dielectric for a generally incident unpolarized electromagnetic wave of wavelength $\lambda_1$ in the ultraviolet, visible, and infrared regions. The dielectric layers comprise a medium having an index of refraction, $n_o$, and at least a first and a second layer connected to said medium deposited by vaporization of material having alternatively high and low indices of refraction, $n_2$ and $n_1$, respectively. The layers having the high and low refractive indices exhibit the same effective optic layer thickness equal to $(\frac{1}{4})(j+1)\lambda_1$, where $j$ = even integers, for the refractive index structure $n_s(n_1, n_2)^k n_o$ or $n_s(n_1, n_2)^k n_1 n_o$ and $n_1$ = index of refraction of the first layer connected to the medium, $n_2$ = index of refraction of the second layer connected serially to said first layer, and $k = 0,1,2,\ldots$ The resulting reflected wave is polarized parallel or vertically to the plane of incidence.

Figure 1:
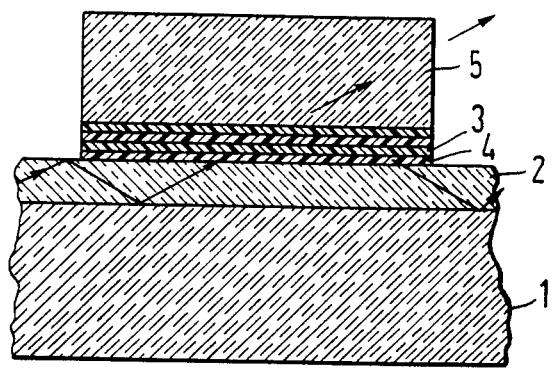
FIG. 1 depicts a cross sectional view of a narrow band reflection polarizer having a dielectric waveguide layer arranged on a substrate in accordance with the invention.

In FIG. 1, a dielectric wave guide layer 2 with a refraction index $n_o$ is applied onto a substrate 1 made of glass. A light wave incident from the left is coupled into a multiple layer system 3 by means of a transmission line. The refractive indices of the multiple layer 3 are greater than the effective refraction indices of the waveguide dependent as a function of the propagated modes. The multiple layer system 3 is so designed that the transmitted light is partially back coupled into the waveguide layer 2 and partially absorbed by absorber 5 made of a highly absorbing glass having an index of refraction $n_r$. The beam portions which reach the outer matted surfaces of the absorber 5 are scattered outward. The light portion back coupled into the waveguide layer 2 and further conveyed therein is polarized and spectro-selectively filtered.

Figure 2:
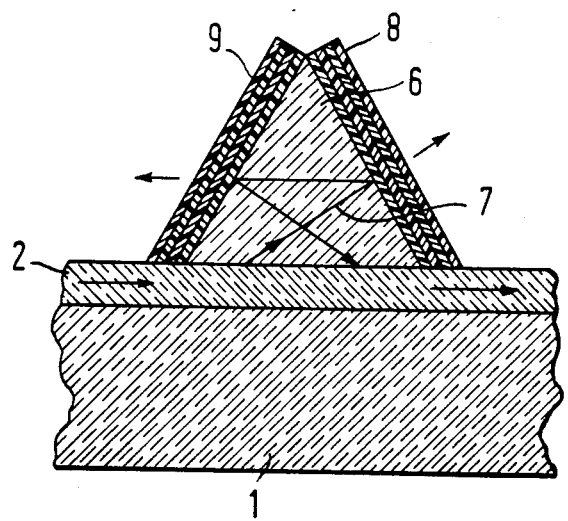
FIG. 2 depicts a cross sectional view of a narrow band reflection polarizer having a symmetric prism arranged on a wave guide layer in accordance with the invention.

In FIG. 2, the waveguide layer 2, arranged on the substrate 1, has a symmetric prism 6 arranged thereon with such requisite dihedral angles resulting in the illustrated desired beam path. On the lateral faces of the prism, a multiple layer system 8 and 9 is arranged, respectively. If both have the same construction, the penetrating light beam is affected in the same manner, thus increasing the efficiency over a corresponding design having only one multiple layer system. The light back coupled into the waveguide layer 2 is further transmitted toward the right.

Figure 3:
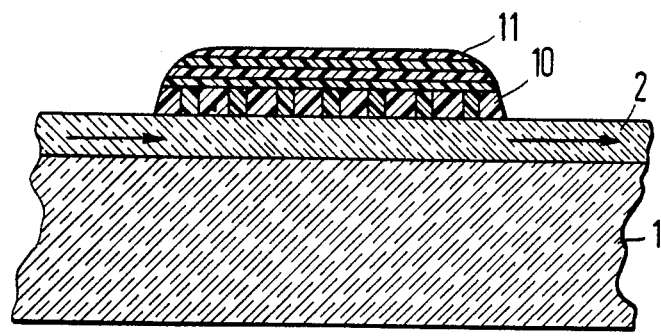
FIG. 3 depicts a cross sectional view of a narrow band reflection polarizer having a diffraction grid arranged on a waveguide layer in accordance with the invention.

In FIG. 3, the waveguide layer 2, arranged on the substrate 1, interfaces a diffraction grid 10 arranged along a prescribed path of the light beam. For a light beam transmitted below the diffraction grid 10 in the waveguide layer 2, the design provides transmission into a multiple layer system 11 arranged above the diffraction grid 10, and upon partial reflection of the transmitted light beam in this multiple layer system, it provides for back coupling into the waveguide layer 2. The longer the area covered by the diffraction grid and the multiple layer system positioned above, the more often the light transmitted under the diffraction grid is back coupled into the multiple layer system, and the more complete is the influence over the interaction of the light by the multiple layer system.

Figure 4:
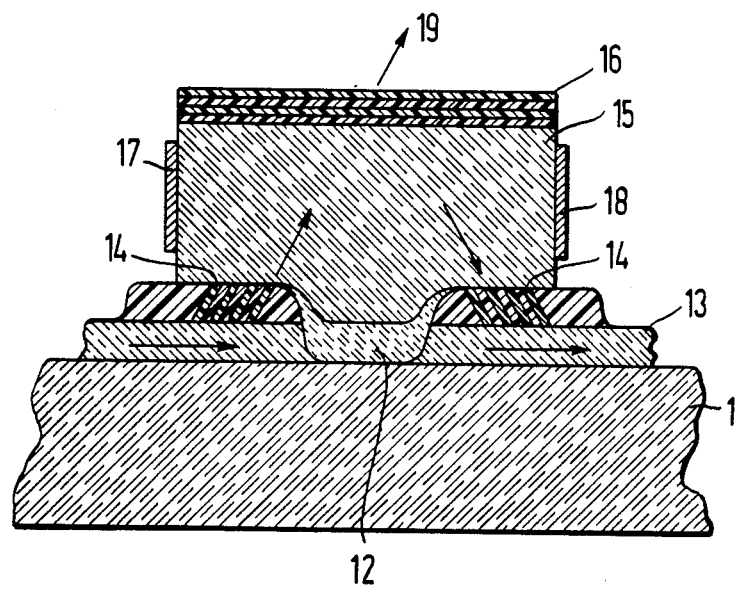
FIG. 4 depicts a cross sectional view of a narrow band reflection polarizer having a separation layer interrupting a waveguide layer in accordance with the invention.

In FIG. 4, a waveguide layer 13, interrupted by a separating layer 12, is arranged on the substrate 1. Located on top of the waveguide layer 13 a Bragg-grid 14 produced, for example, holographically in a photolacquer, is interrupted by the same separating layer 12. A spacing piece 15, consisting of a modulator crystal and arranged on said Bragg-grid 14, provides a base for a multiple layer system 16. The light which is transmitted in the waveguide layer from the left, is coupled into the spacing piece 15 via the Bragg-grid, and finally influenced in the multiple layer system 16. The desired beam portion passes through the spacing piece wherein it is modulated by a voltage applied to electrodes 17 and 18. Through the Bragg-grid 14 this beam portion is coupled into the portion of the waveguide 13, and here, further transmitted to the right, as shown at FIG. 4. In order to obtain a high degree of coupling and decoupling, the grid planes of the Bragg-grid are so inclined that the Bragg requirements and the phase adaptation requirements are optimally met. The undesired beam portion is outwardly radiated as indicated by arrow 19.

Instead of the Bragg-grid, simpler phase- or amplitude- grids may also be used.

The multiple layer system 16, as in all variants of the invention, depends upon a specific construction, a frequency-selective filtering, a polarization filtering, a beam division, or total or partial reflection, respectively.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the following claims.

We claim as our invention:

1. A waveguide structure for masking out specific polarization conditions of a light ray of predetermined frequency utilizing a narrow band reflection polarizer, comprising:
   a substrate;
   a planar waveguide layer applied onto said substrate, said waveguide having an index of refraction, $n_o$;
   a narrow bandwidth reflection polarizer applied onto said waveguide layer, said polarizer comprising a dielectric multilayer adjacent said waveguide layer and an absorbant glass plate having an index of refraction $n_s$ adjacent said dielectric multilayer;
   said dielectric multilayer being comprised of two alternating layers, one layer having an index of refraction $n_1$, the other layer having an index of refraction $n_2$, with $n_o < n_1$, $n_1 < n_2$ and $n_s > n_1$;
   said layers having the same effective optic layer thickness equal to odd integrals of $\frac{1}{4}\lambda_1$, wherein $\lambda_1$ is a wavelength of an incident unpolarized electromagnetic wave selected from the range extending from the ultraviolet through infrared regions, traveling through said waveguide layer;
   and said waveguide structure having a refractive index structure defined by:

$$n_s(n_1, n_2)^k n_o$$

wherein K = 1,2,3, . . . .

2. A waveguide structure for masking out specific polarization conditions of a light ray of predetermined frequency utilizing a narrow band reflection polarizer, comprising:
   a substrate;
   a planar waveguide layer applied onto said substrate, said waveguide having an index of refraction, $n_o$;
   a narrow bandwidth reflection polarizer applied onto said waveguide layer, said polarizer comprising a dielectric multilayer adjacent said waveguide layer and an absorbant glass plate having an index of refraction $n_s$ adjacent said dielectric multilayer;
   said dielectric multilayer being comprised of two alternating layers, one layer having an index of refraction $n_1$, the other layer having an index of refraction $n_2$, with $n_o < n_1$, $n_1 < n_2$ and $n_s > n_1$;
   said layers having the same effective optic layer thickness equal to odd integrals of $\frac{1}{4}\lambda_1$, wherein $\lambda_1$ is a wavelength of an incident unpolarized electromagnetic wave selected from the range extending from the ultraviolet through infrared regions, traveling through said waveguide layers;
   and said waveguide structure having a refractive index structure defined by:

$$n_s(n_1, n_2)^k n_1 n_o$$

wherein K = 1,2,3, . . .

* * * * *